US009223985B2

(12) United States Patent
Eberlein et al.

(10) Patent No.: US 9,223,985 B2
(45) Date of Patent: Dec. 29, 2015

(54) RISK ASSESSMENT OF CHANGING COMPUTER SYSTEM WITHIN A LANDSCAPE

(71) Applicants: Peter Eberlein, Walldorf (DE); Volker Driesen, Walldorf (DE)

(72) Inventors: Peter Eberlein, Walldorf (DE); Volker Driesen, Walldorf (DE)

(73) Assignee: SAP SE, Walldorf (DE)

( * ) Notice: Subject to any disclaimer, the term of this patent is extended or adjusted under 35 U.S.C. 154(b) by 27 days.

(21) Appl. No.: 14/049,817

(22) Filed: Oct. 9, 2013

(65) Prior Publication Data

US 2015/0101056 A1    Apr. 9, 2015

(51) Int. Cl.
*G06F 21/00*    (2013.01)
*G06F 21/57*    (2013.01)

(52) U.S. Cl.
CPC .................................. *G06F 21/577* (2013.01)

(58) Field of Classification Search
USPC .................................................. 713/189–194
See application file for complete search history.

(56) References Cited

U.S. PATENT DOCUMENTS

| | | | |
|---|---|---|---|
| 7,752,562 B2 | 7/2010 | Mohanty et al. | |
| 8,250,135 B2 | 8/2012 | Driesen et al. | |
| 8,346,895 B2 | 1/2013 | Cherdron et al. | |
| 2007/0067845 A1* | 3/2007 | Wiemer ............... | G06F 21/577 726/25 |
| 2007/0239495 A1 | 10/2007 | Osborn et al. | |
| 2009/0018885 A1 | 1/2009 | Parales | |
| 2009/0113394 A1 | 4/2009 | Weber et al. | |
| 2010/0262444 A1 | 10/2010 | Atwal et al. | |
| 2011/0066562 A1 | 3/2011 | Stapleton et al. | |
| 2011/0126111 A1 | 5/2011 | Gill et al. | |
| 2011/0166982 A1 | 7/2011 | Cole et al. | |
| 2012/0053981 A1 | 3/2012 | Lipps et al. | |
| 2012/0116839 A1 | 5/2012 | Akkiraju et al. | |
| 2012/0303396 A1 | 11/2012 | Winkler et al. | |
| 2013/0211872 A1 | 8/2013 | Cherry et al. | |
| 2013/0304535 A1 | 11/2013 | Hu et al. | |
| 2014/0173739 A1* | 6/2014 | Ahuja et al. ................... | 726/25 |

OTHER PUBLICATIONS

Leslie Willcocks, et al.; "Risk Assessment and Information Systems"; European Journal of Information Systems; (1994); pp. 127-138; 3 pages; DOI:10.1057/ejis.1994.13.

(Continued)

*Primary Examiner* — Ghazal Shehni
(74) *Attorney, Agent, or Firm* — Fountainhead Law Group PC

(57) ABSTRACT

Embodiments assess risk posed by changing a computer system present within a landscape of other computer systems. Agents provide a central assessment engine with data relevant to considerations such as system criticality, correlation between related systems, and dependence between different systems. The criticality parameter reflects an importance of a system and a corresponding change risk impact. System correlation is measured to allow comparison between systems, and a risk of failure of a change to the systems. Dependencies between systems are measured to define a set of systems to be changed in a coordinated manner. Change statistics collected in a database, may allow correlating systems across various customers, improving accuracy of risk prediction. Embodiments may facilitate iterative planning, where a different dependency permits the definition of smaller sets of systems offering lower risk of failure upon change implementation. Embodiments may allow correlation measurement between systems and a copy created for testing.

20 Claims, 7 Drawing Sheets

(56) References Cited

OTHER PUBLICATIONS

Edmir Parada Vasques Prado; "Risk Analysis in Information Technology and Communication Outsourcing"; Journal of Information Systems and Technology Management; Sep./Dec. 2011; vol. 8, No. 3, pp. 605-618; 14 pages; TECSI FEA USP, Sao Paulo, Brazil.

Thomas Kern, et al.; "Application Service Provision: Risk Assessment and Mitigation"; MIS Quarterly Executive vol. 1, No. 2; Jun. 2002; pp. 113-126; 14 pages; University of Minnesota.

* cited by examiner

RISK ASSESSMENT OF CHANGING COMPUTER SYSTEM WITHIN A LANDSCAPE

BACKGROUND

Embodiments relate to system analysis, and in particular, to assessing a risk and/or cost of changing one system that is part of a landscape of interconnected systems.

Unless otherwise indicated herein, the approaches described in this section are not prior art to the claims in this application and are not admitted to be prior art by inclusion in this section.

Computer systems, including database systems, currently experience a high degree of interconnectivity with other systems. For example, an underlying database system may be connected with a number of different business applications (e.g., CRM, financials, procurement, logistics) that are present in overlying application layer(s).

Generally, it may become necessary to change the features of one such system (e.g. for upgraded performance, improved reliability) that is interconnected with others in the landscape. In a large landscape comprising many interconnected systems, however, the cumulative risk of a failure during the execution of changes escalates with the increasing connectedness of the systems and landscape size.

In particular, a change may comprise a group of independent events, where success of all singular event(s) is required within the landscape in order to make the overall change a success. Under these conditions, the combined probability for success quickly drops with a number of the events that are required to be combined.

Conventionally, in making such a change to one system the characteristics of a landscape comprising a set of interconnected systems, may not be subjected to systematic analysis by tools to assess/reduce a risk of changing a system within that landscape. Rather, such an analysis may typically be conducted manually in an intuitive and nonsystematic way, by human administrators based upon their individual experience.

Thus, there is a need for tools performing systematic analysis of characteristics of a landscape comprising a plurality of interconnected systems, with an eye toward providing an assessment of the risk and/or cost of changing one of those systems.

SUMMARY

Embodiments assess risk posed by changing a computer system present within a landscape of other computer systems. Agents provide a central assessment engine with data relevant to considerations such as system criticality, correlation between related systems, and dependence between different systems. The criticality parameter reflects an importance of a system and a corresponding change risk impact. System correlation is measured to allow comparison between systems, and a risk of failure of a change to the systems. Dependencies between systems are measured to define a set of systems to be changed in a coordinated manner. Change statistics collected in a database, allow correlating systems across various customers, improving accuracy of risk prediction. Embodiments may facilitate iterative planning, where a different dependency permits the definition of smaller sets of systems offering lower risk of failure upon change implementation. Embodiments may allow correlation measurement between systems and a copy created for testing.

An embodiment of a computer-implemented method comprises providing a landscape comprising a plurality of interconnected computer systems, causing a risk assessment engine to receive a risk parameter from an agent of one of the plurality of computer systems of the landscape, and causing the risk assessment engine to process the risk parameter to generate a risk value of making a change to the one of the plurality of computer systems.

An embodiment of a non-transitory computer readable storage medium embodies a computer program for performing a method comprising providing a landscape comprising a plurality of interconnected computer systems, causing a risk assessment engine to receive a risk parameter from an agent of one of the plurality of computer systems of the landscape, and causing the risk assessment engine to process the risk parameter to generate a risk value of making a change to the one of the plurality of computer systems.

An embodiment of a computer system comprises one or more processors, and a software program executable on said computer system. The software program is configured to provide a landscape comprising a plurality of interconnected computer systems, cause a risk assessment engine to receive a risk parameter from an agent of one of the plurality of computer systems of the landscape, and cause the risk assessment engine to process the risk parameter to generate a risk value of making a change to the one of the plurality of computer systems.

In some embodiments the risk parameter reflects a criticality of the one of the plurality of computer systems of the landscape.

According to certain embodiments the criticality is determined from a number of users and/or a database size of the one of the plurality of computer systems of the landscape.

In various embodiments the risk parameter reflects a dependency between the one of the plurality of computer systems of the landscape and another of the plurality of computer systems of the landscape.

In particular embodiments the dependency is determined from the one of the plurality of computer systems of the landscape having a similar feature as another of the plurality of computer systems of the landscape, the similar feature comprising a runtime, a code subset, and/or a history of change events.

According to some embodiments the risk parameter reflects a correlation between the one of the plurality of computer systems of the landscape and another of the computer systems of the landscape.

In particular embodiments the correlation is determined from a runtime dependency between the one of the plurality of computer systems of the landscape, and another of the plurality of computer systems of the landscape.

The following detailed description and accompanying drawings provide a better understanding of the nature and advantages of various embodiments.

DETAILED DESCRIPTION

Figure 1:
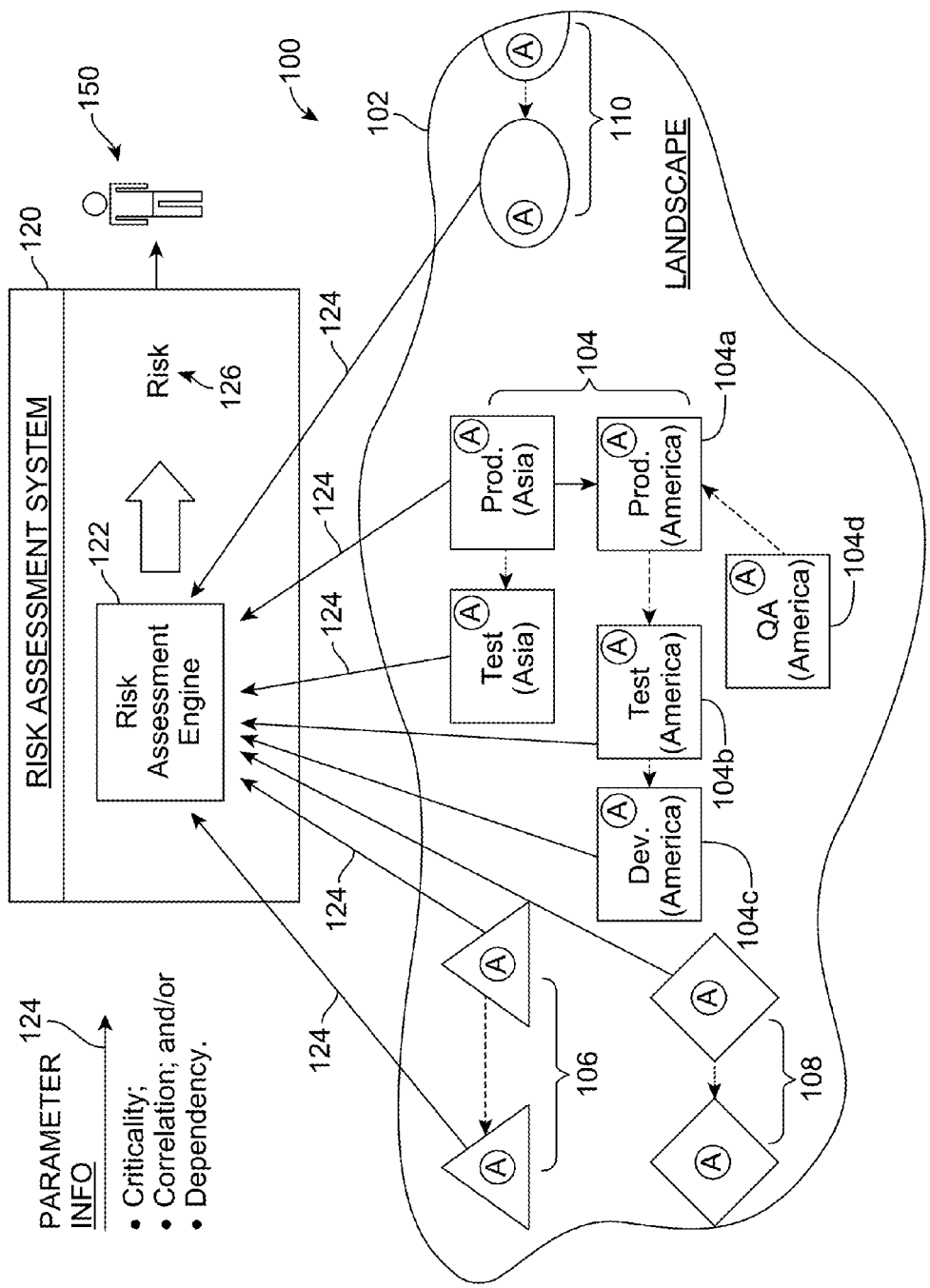
FIG. 1 shows a simplified view of an embodiment of a system for performing risk assessment of change in a computer landscape.

Described herein are techniques for assessing the effect of changing a computer system that is part of a landscape comprising other, interconnected or related computer systems. For purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

As noted above, in a landscape comprising interconnected computer systems, the cumulative risk of a failure during the execution of changes becomes higher and higher with increasing connectedness of the systems and landscape size. Such failure can occur, for example, where one system in the landscape calls for a change event (e.g., for upgraded performance).

If error situations in change events are independent, the probability of the combined event to pass without error, is smaller than the probability for each individual change event. Thus, if a change to A and a change to B each have a probability to fail of 10%, the combined event to change A and B together in one transaction has a probability to fail of ~19%, detailed as follows:

(success rate for $A$)×(success rate for $B$)=(success rate for $A$ and $B$)

(90%)×(90%)=(81%); thus, the error rate is 19%.

For a group of independent events, where the success of all singular events is required within the landscape in order to make the overall change a success, the combined probability for success quickly drops with the number of events combined.

The correlation of related systems may also be a consideration. Specifically, if the systems A and B are correlated, the probability of an error situation A and B is no longer success rate of A times the success rate of B. For example, where system B is an exact copy of system A, the probability a successful change of A and B is the success rate of A.

Conventionally, such a correlation approach may be employed in testing simple landscapes. Specifically, the original system A is copied to create a system B. The copied system (system B) is tested under a change until the change works. Then, the system A is changed.

In large landscapes however, the risk that an error may occur increases. Conventionally, this risk in larger landscapes is attempted to be assessed and mitigated utilizing a large set of individual tests for each change.

While such a conventional approach does reduce a likelihood that individual changes may result in failure, the costs for executing changes increase faster than a linear rate with landscape size. Specifically, a number of additional tests per system increases linearly with the number of systems (and changes). However, systems in landscapes are rarely stand-alone but rather are closely interconnected, that interdependence contributes non-linear cost effects. That is, the more dependencies that exist, the more tests that are required. And, the more dependencies there are between systems, the bigger the impact of a failure and the harder a roll-back of single changes to a consistent state in the landscape.

Conventionally, the analysis of characteristics of computer system landscapes for risk and cost of making changes to individual systems, is performed by administrators based on their experience. However, such approaches are subject to the intangible vagaries of the particular experience and judgment of individual administrators. Accordingly, embodiments describe methods and systems that are configured to perform such landscape analysis on a systematic and automated basis.

Accordingly, embodiments as presented herein are configured to assess risk posed by making a change to a computer system present within a landscape of other computer systems. Agents provide a central assessment engine with data relevant to considerations such as system criticality, correlation between related systems, and dependence between different systems. The criticality parameter reflects an importance of a system and a corresponding change risk impact. System correlation is measured to allow comparison between systems, and a risk of failure of a change to the systems. Dependencies between systems are measured to define a set of systems to be changed in a coordinated manner. Change statistics collected in a database, allow correlating systems across various customers, improving accuracy of risk prediction. Embodiments may facilitate iterative planning, where a different dependency permits the definition of smaller sets of systems offering lower risk of failure upon change implementation. Embodiments may allow correlation measurement between systems and a copy created for testing.

FIG. 1 shows a simplified view of an embodiment of a system for performing risk assessment of change in a computer landscape. In particular, system 100 comprises a landscape 102 comprising a number of different but interrelated computer systems.

Specifically, a first type of computer system 104 is represented by squares. This first computer system type is designed to perform a specific function, for example Customer Relationship Management (CRM).

In FIG. 1, a second type of computer system 106 is represented by triangles. This second computer system type may be designed to perform a different function, for example Enterprise Resource Planning (ERP).

A third type of computer system 108 is represented in FIG. 1 by diamonds. This third computer system type may perform yet another function. In one example this third computer system type may comprise a database storing information in support of the first computer system 104 (CRM) and/or second computer system (ERP) within the landscape.

Still another type of computer system 110 is represented in FIG. 1 by circles. This computer system may perform yet a different function, for example logistics management.

Multiple varieties of each computer system type may be present within the landscape. For example, the first computer system type may be present in a production variety 104$a$ exhibiting full functionality.

The first computer system type may also be present in a test variety 104$b$ lacking the productive business data present in the production variety. The first computer system type may also be present in a development variety 104$c$ lacking the test data of the test variety.

Other varieties of computer systems are possible. For example, a copy 104$d$ of the production variety may be used for Quality Assurance purposes.

The different varieties of a type of computer system may be characterized in terms of predecessor and successor systems. For example, in FIG. 1 the test variety is derived from the production variety, and hence is a successor of that system. As the development variety is derived from the test variety, the test variety may be understood as predecessor to the development variety.

FIG. 1 also shows that different production and test varieties may be created for different geographic areas. Thus, while the varieties 104a-d may relate to the Americas, other varieties of the same type of system may perform a similar function for a different geographic area (e.g., Asia).

In FIG. 1, correlation between different varieties of computer systems of the same type, is shown with a dashed arrow. As discussed in detail below, this correlation information may be considered by embodiments in performing a risk assessment function.

Specifically, the system 100 further comprises a risk assessment system 120. Risk assessment system 120 is configured to receive one or more parameters relating to risk information, from each variety of each type of computer system present in the landscape of FIG. 1. Each computer system may include an agent A that is configured for this purpose.

In particular, the risk assessment system 120 comprises a risk assessment engine 122 that is configured to receive a plurality of inputs in the form of risk parameter information 124 from the computer systems making up the landscape. From these inputs, the risk assessment engine 122 is configured to provide an output 124 comprising an assessment of the risk posed by making a change to one of the computer systems of the landscape.

Based upon this risk value output by the risk assessment system 120, a user 150 may implement one or more risk mitigation strategies. Details regarding exemplary risk mitigation strategies are discussed further below.

As mentioned previously, in one example the risk parameter information 124 reflects a correlation between one computer system and another computer system. This correlation information may indicate the degree of relatedness between the two computer systems. Thus, a high correlation would be indicated for computer system 104d representing a quality assurance (QA) copy of a production variety 104a.

Another example of risk parameter information 124 that may be received by the risk assessment engine 122, is criticality. This criticality parameter reflects a relative level of importance of the computer system. Thus, a production variety of a computer system that is actually utilized in conducting a customer's business functions, would be expected to have a higher value criticality than a criticality of a computer system of the development variety or a copy that is made merely for QA purposes.

Still another example of risk parameter information 124 that may be received by the risk assessment engine 122, is dependency. This dependency parameter reflects a degree of interrelation between one computer system and another. As discussed in connection with the example below, factors that may be considered in determining the dependency parameter may include but are not limited to, sharing of components between systems, runtime dependencies between systems, integration dependencies, configured connections, dependency coupling, and/or deployment to a common platform or container.

Figure 2:
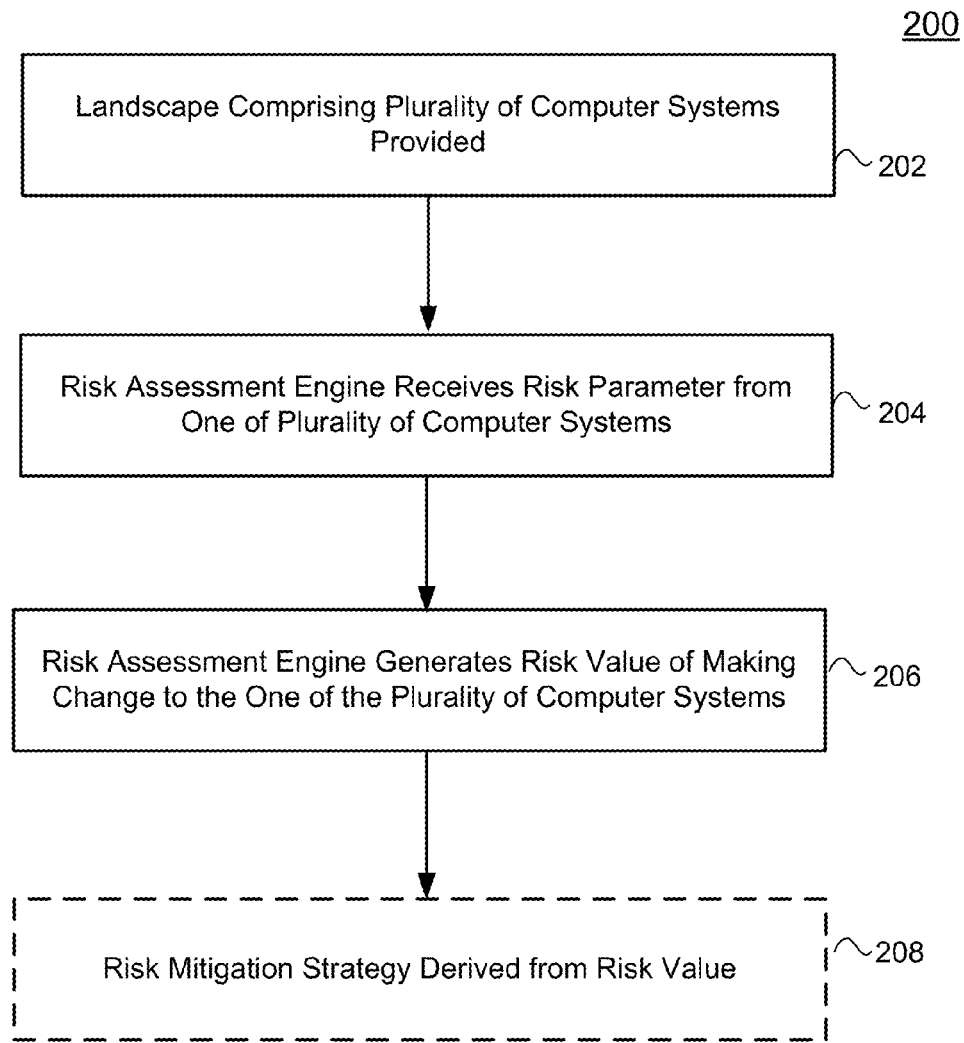
FIG. 2 presents a simplified flow diagram of a method in accordance with an embodiment.

FIG. 2 presents a simplified flow diagram of a method according to an embodiment. In a first step 202, a landscape comprising a plurality of interconnected computer systems is, provided. In a second step 204, a risk assessment engine is configured to receive a risk parameter from one of the plurality of computer systems of the landscape. In a third step 206, the risk assessment engine processes the risk parameter to generate a risk value for making a change to the one of the plurality of computer systems.

In a fourth step 208, a user may seek to implement a risk mitigation strategy based upon the risk returned by the risk assessment engine. Examples of possible options for risk mitigation can include but are not limited to, removing dependencies that can lead to lower risk, creating a copy of a system and testing that copy, and iteration of planning efforts.

Pursuant to the risk assessment function just described, embodiments of methods and systems according to embodiments may seek to:

reduce risk of change at substantially constant cost (e.g., by optimizing the impact of predetermined testing resources), or reduce cost at substantially constant risk (e.g., by reducing testing resources to achieve a same amount of risk).

As used herein, risk is defined as the product of impact and probability:

$$risk = impact * probability.$$

The performance of risk assessment according to certain embodiments is now specifically described in connection with a landscape of computer systems available from SAP AG of Walldorf, Germany.

EXAMPLE

SAP AG implements a variety of computer system landscapes for use by different customers, which include at least one database computer system. Typically, on-premise landscapes of SAP systems may deal with "individual systems": one system of a type in a landscape, each with its own related test systems.

With landscapes of a large number of related/correlated systems (i.e. an installation of the same product for different regions), the costs for testing can be reduced as compared to conventional methodology, where the correlation is known and relied upon in the testing of the changes.

The probability of error situations arising can also be reduced by spending a same amount of testing effort, by performing an analysis to identify those tests not providing additional insight (i.e. do not increase test coverage), and replacing them with additional tests of other scenarios.

In one example, out of a set of systems with the same business function/use but different content, one test can be sufficient. This example refers to correlations between related systems.

In another example, out of a set of systems with the same business function/use, the system with the lowest criticality can be changed after a test first, thereby productively increasing the test coverage of the critical production.

Risk can be measured and/or quantified according to a number of considerations. One such consideration is system criticality. Other considerations include system correlation, and system dependencies.

System Criticality

System criticality is now discussed. Embodiments may measure a set of system characteristics to identify those areas where failure risk is high, and areas where failure risk is low. Various types of data can be evaluated in order to measure individual characteristics allowing rating of system complexity.

One such data type is database size. In general, larger systems are more important, and at the same time they are more difficult to change (e.g. with respect to downtime).

Another data type is a number of users and/or a number of tenants. Typically, the more users and the more tenants, the broader is the use and hence the larger the potential impact of a failure.

Yet another data type is a number of components and/or a number of applications deployed. Specifically, the more components and/or applications that are deployed, the higher the risk that something goes wrong. The computation is similar as above. Changes to these components are to a certain extent independent, thus the risk of failure is higher for more components.

Still another possible data type is a number of processes that are configured. Again, the more processes configured to be used, the greater the risk that some process will fail as a result of a change. This is because to a certain extent the individual processes are independent of one another.

Still other types of possible data that may be considered in performing computer landscape analysis may include but are not limited to:
 different hardware types used;
 a level of distribution;
 disaster recovery setup configurations;
 High Availability (HA) setup.

These parameters increase the landscape setup complexity. The greater the complexity they reflect, the higher the risk in performing a change.

The type of computer system at issue, may also be a consideration in assessing the risk of failure posed by changing one system within a landscape. One class of computer system type may be determined primarily upon the degree of correlation of that computer system to other, related computer systems. Examples of such related computer system types include but are not limited to, those used in development, in testing, and in production.

Another class of computer system type may be determined primarily upon the function performed by the computer system, and its interconnection with other systems. Examples of such dependent computer system types include but are not limited to, human resources (HR) systems, financial (FIN) systems, logistic systems, and production systems.

An administrator or other human user may also provide data for use in assessing risk. For example, an administrator may manually set a criticality level of a system. This setting may be defined by the administrator based upon a perceived severity of the impact of a failure of that particular system.

Independently of automatically determined parameters, a customer can define a most critical system. In some instances, this can be a rather small system with few users, whose importance may not be apparent from data provided to the analysis engine.

Maintenance windows are another factor in performing computer landscape system assessment. For example, if there exists only one or a few opportunities to perform maintenance on a given system per year, the impact of a failed change would be higher than if the change could be repeated in a maintenance window occurring only some days or weeks later.

If several changes are planned in one maintenance window, typically, these target status of the changes are tested only in combination. Thus if one change fails, all changes are to be reverted.

Taken alone or in combination, the above data can be used to define the function "Criticality (System)". This function can be employed to assess change risk within a landscape of computer systems. As used herein, "criticality" may be defined as being the same as "Impact".

According to certain embodiments, the higher the criticality function, the more critical the system within the landscape. In some specific embodiments, this criticality function may have a range [0 . . . 1].

System Correlation

The role the correlation between related systems in a landscape plays in change risk assessment is now described.

For independent change events, the combined risk is higher and the learning in one change usable for other changes is low. Embodiments may thus allow specifying the correlation of different but related system, and of changes thereto.

Various data of computer systems may be evaluated to determine correlation between related systems. One example of such data useful for this purpose is the system runtime. In the context of a HANA in-memory database available from SAP, AG, a change to a HANA system is not correlated to a change to an Advanced Business Application Programming (ABAP) system, i.e. a system encoded in ABAP or using ABAP.

Thus, in certain embodiments systems with different runtimes are not deemed to be correlated. Systems with the same runtime may be considered as being correlated.

For those systems within the landscape having a same runtime, the system "bill of material" (the set of components and applications deployed) may further be considered in determining a degree of correlation. For example, systems having different components may not be deemed correlated. Systems having the same components or a subset of common components, may be considered as being correlated.

Another data type that may be employed to determine correlation, is functional coverage of the system. Thus, utilization of a common subset of business functions as between different systems within a landscape, may be indicative of correlation of those systems.

Another data type that may be indicative of correlation, is modification of the system. Where a proposed change affects a common subset of the system code, correlation between the systems may again be indicated.

For systems with the same runtime and a common set of components, a history of measured system change events may be indicative of a correlation within the landscape. Computer systems having similar histories of past change events may be considered more correlated than computer systems having different change events.

Of those systems having a similar histories of past change events, still additional further detail may be considered in determining a degree of correlation. For example, systems may be considered more correlated when the changes result in a similar set of failed change events, and/or other issues were found to arise in those past change events.

System origin may also be considered in determining system correlation within a landscape. For example, systems which are an installation of the same product version can be evaluated for higher level of correlation by looking at the system "origin".

Also, systems installed from the same product archive/source (e.g. DVD) may be considered to have a higher correlation. Thus, a system installed with a particular version may be considered to have higher correlation than a system installed with an earlier version and then upgraded.

Time may be yet another factor considered in determining a degree of system correlation. Specifically, systems may be deemed to have a high level of correlation where one is the copy of another.

However, such correlation may be considered to decrease over time. Thus, correlation may decline once the copy is created, and over the intervening time changes are made to the system.

As described above, taken alone or in combination these factors may serve to define the function "Correlation (System1, System2)". The higher the level of this function, the higher the degree of correlation between these systems present within the landscape. In certain embodiments, this correlation function may have a range of [0 . . . 1].

For computer systems with high correlation, the probability of a failure for the same change is similarly high or low. Thus according to embodiments, this correlation consideration can be used to define a same level of probability, even if the absolute level of that probability is unknown.

System Dependencies

The considerations for identifying dependencies between individual computer systems making up a landscape, are now described.

For systems depending on each other, local changes can have broader impact. To derive those computer systems implicated in a change event, a level of dependency of the systems is to be determined Various types of data may be evaluated to determine system dependency. One example of such a data type reflects deployment dependencies (e.g. a double stack PI—Process Integration system uses ABAP and Java).

For example, a product comprising different components deployed to different systems, can give rise to a strong dependency between the systems. Typically, these dependent system sets are changed simultaneously, and a failure in one may constitute a reason for a fallback of the change in both systems.

Runtime dependencies may also be considered in determining dependency. Typically, the operating system is updated before the application server. Afterward, the database platform is updated.

In advance, ABAP systems use external components which have runtime dependencies to the ABAP system, like the ABAP Enqueue and message server and SAP WebDispatcher. For example, a change to a system S1 (or runtime component) must be deployed before a change to system S2, in at least the following instances:

OS, DB, platform (layered);

web dispatcher, Enqueue server, IGS, print layouting via adobe (interdependencies)

Integration dependencies (e.g. cross-system scenarios) may also be considered in determining dependency. An example includes scenarios defined by the customer within a management infrastructure system (e.g. Solution Manager available from SAP AG of Walldorf, Germany).

Another example of dependency may arise from configured connections. For example, a remote function call (RFC) connection, web service connection, or other kind of connection(s) may define a runtime dependency. Typically, for systems (S1 . . . Sn) with runtime dependencies having versions (V1-old . . . Vn-old) and which are upgraded to versions (V1-new and Vn-new), the combination of versions is tested if not all of the systems are upgraded simultaneously (e.g. V1-new with Vn-old, V1-old with Vn-new, etc. . . . ).

Dependency coupling may also be considered in determining dependency between different computer systems within a landscape. Thus where two systems are being deployed in the same platform and/or container, systems and products can be deployed to a common platform and/or container.

For example, two systems may be deployed in one database ("Multiple Components One Database"). This is a typical scenario for the HANA in-memory database appliance available from SAP AG.

In such "Multiple Components One Database" configurations, the database defines a container. Where a DB restore is used as a fallback mechanism in case of a disaster, all components in the database are restored, not just individual components.

In addition, if a DB restore is used for one of the components in the container, all components will be restored. This is where the restore does not allow individual restoring of components in one database.

The above, taken alone or in combination may define the function "Dependency (System1, System2)". The higher the value of this function, the larger the dependency it reflects, over a range of [0 . . . 1].

Risk Assessment

Figure 3A:
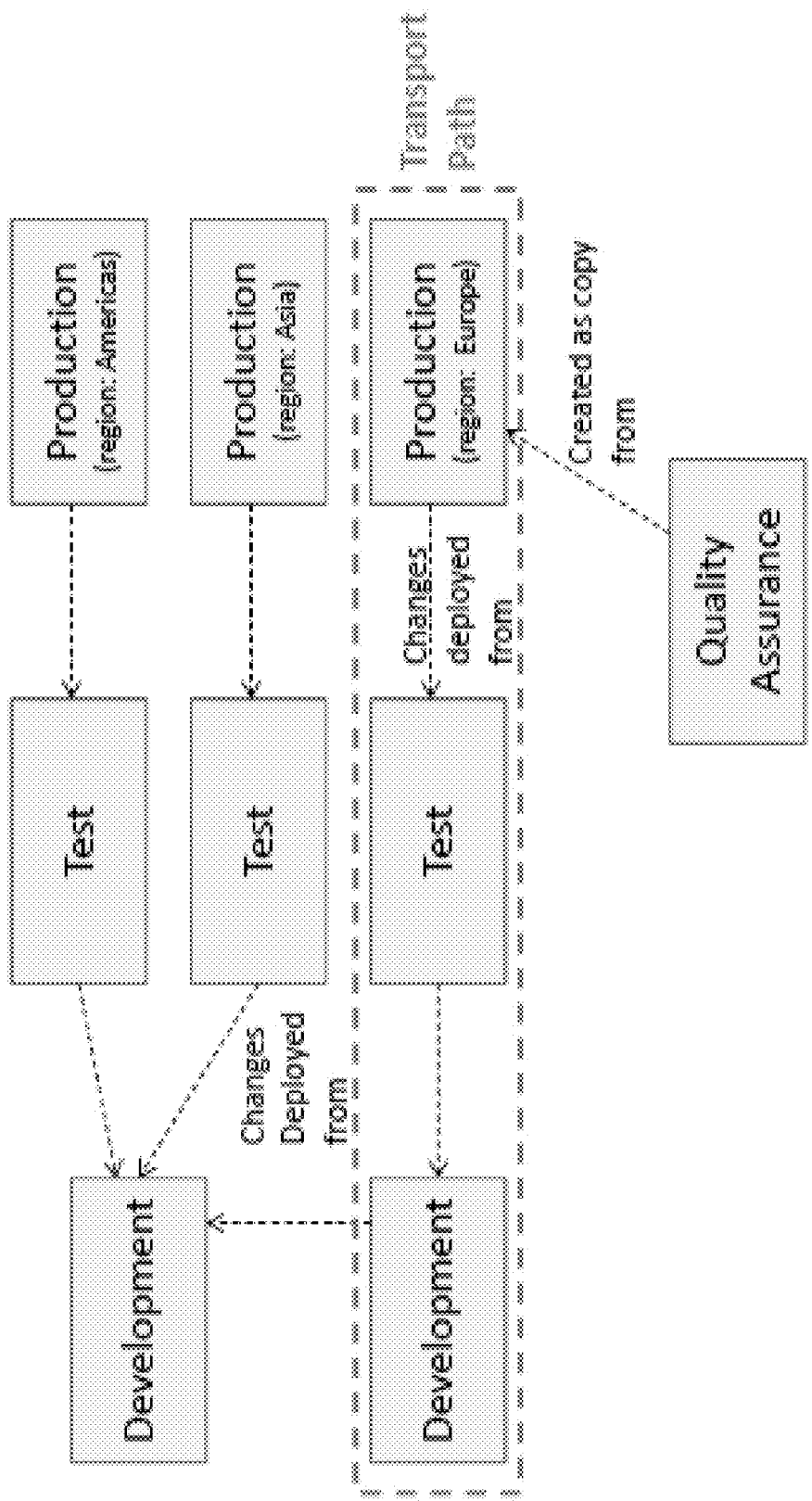
FIGS. 3A-C are simplified diagrams presenting an example of risk assessment performed according to an embodiment.
Figure 3B:
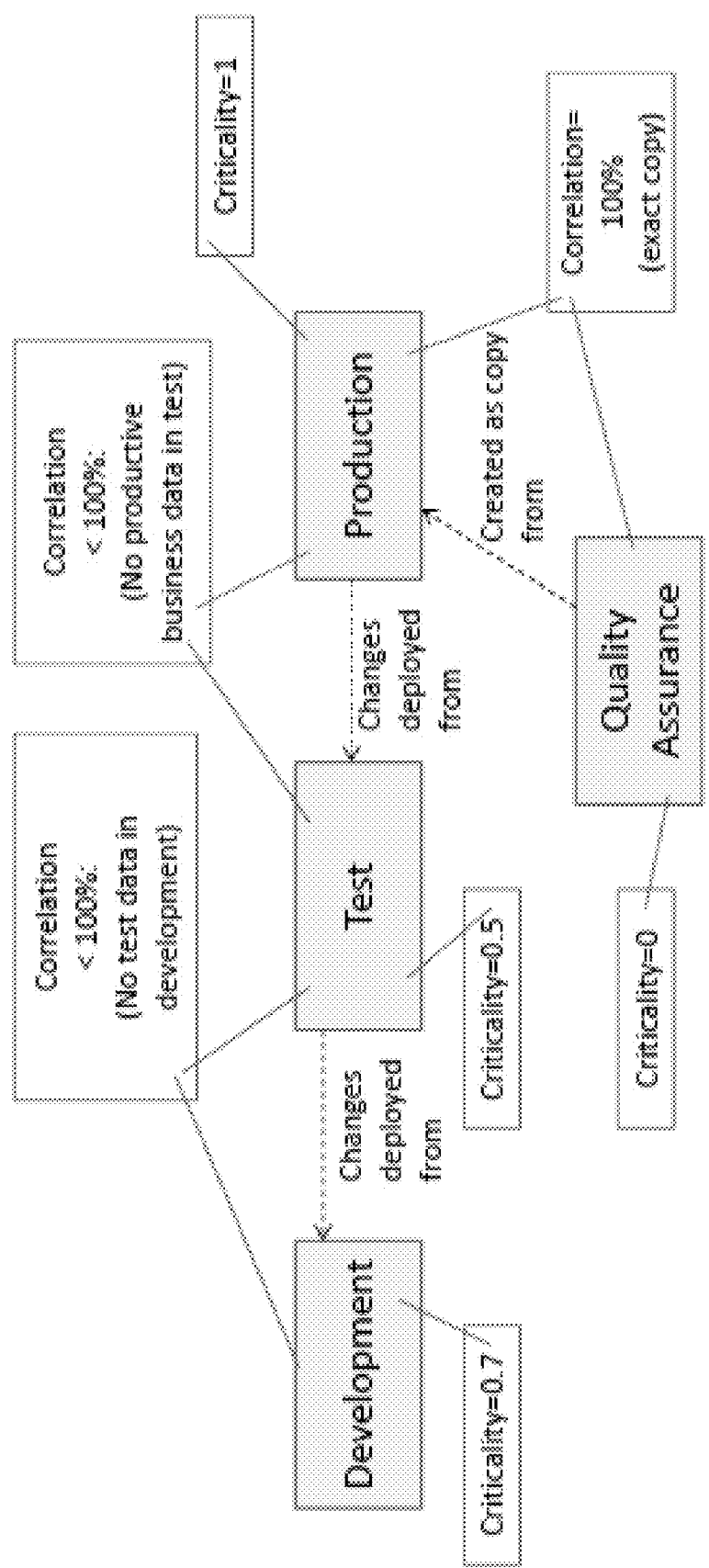
Figure 3C:
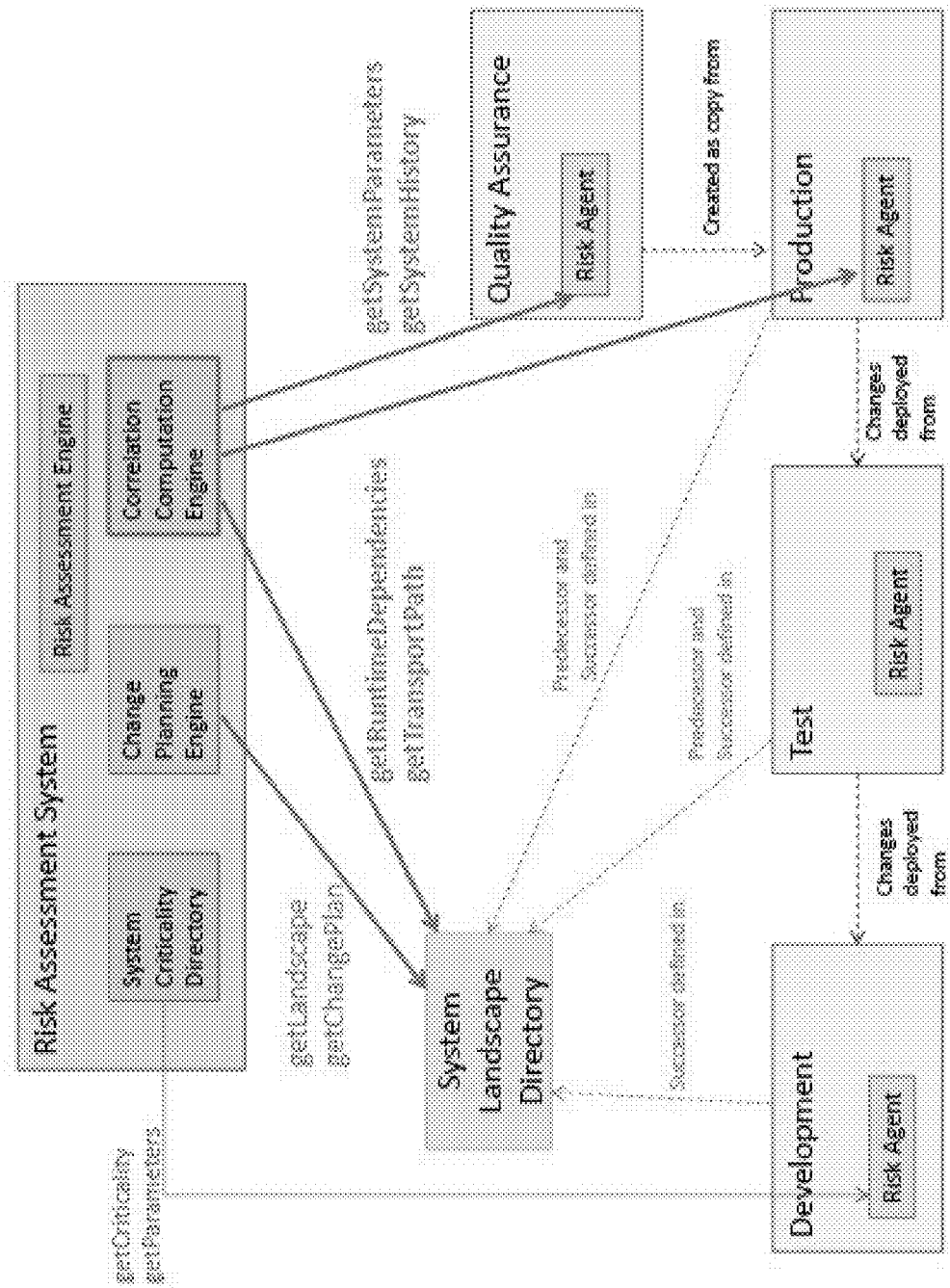

FIGS. 3A-C are simplified diagrams presenting an example of risk assessment performed according to an embodiment. In particular, FIG. 3A shows a simplified view of a computer system landscape wherein customers run five (5) to more than a 100 systems of the same kind.

One dimension illustrated in FIG. 3A is the development and test "transport path" for a production system:

Development-Test-Quality Assurance-Production

Another dimension illustrated in FIG. 3A is that different computer systems of the landscape may be operated in regional (e.g., Americas, Asia, Europe) data centers around the globe. A computer system landscape may be structured in this manner due to considerations such as risk minimization, reducing latency in access, and cost.

FIG. 3B illustrates the risk information parameters of correlation and criticality of the computer systems of the landscape in FIG. 3A. In particular, the correlation parameter reflects the varying differences between production, test, development, and QA varieties of a single type of computer system that are present in the landscape.

In some landscapes, for every production there is typically one development system. In other landscapes, however, one development system may be used for several production systems. An example of this may be where production systems are local to specific regions.

In the example of FIG. 3B, for the correlation parameter it is noted that a copy for purposes of QA is 100% the same. A test system has the same software version, but less business data. A development system has less business and test data.

For the criticality parameter, a high value is noted for the production system that is critical for business. The development system is critical for developers and this is indicated with a high criticality parameter for that system. By contrast, the QA system can be re-built and test can be restored from backup with low impact, and these exhibit lower criticality values.

FIG. 3C shows operation of the risk assessment system in conjunction with the specific computer system landscape just described. In particular, FIG. 3C shows the communication of risk parameters between the central risk assessment system and individual risk agents of separate computer systems making up the larger landscape.

FIG. 3C shows that the risk assessment system may also include a system criticality directory providing information relevant to determining the criticality parameters of systems within the landscape. "getParameters" and "getCriticality" commands may be used to obtain this information.

Also, a correlation computation engine of the risk assessment system, may calculate a correlation parameter based upon information received from agents present within the various computer systems of the landscape. FIG. 3C further shows that a central system landscape directory may provide information relevant to determining the correlation parameters, for example the existence of predecessor and successor computer systems.

The example just described, may be used to generate risk data as follows. A function R is defined for the risk. Risk (System1, Change1) is the risk to apply change Change1 to system System1. Risk (S1, C1; S2, C2) is the combined risk of changing the System1 with Change1 and the System2 with Change2.

The system criticality (=impact) consideration, may be employed in several ways to determine change risk. The risk of a change for systems S1 and S2: if Critical (S1)>Critical (S2), the risk for a change of S1 is higher than the risk for S2.

Risk(S1)>Risk(S2)

In certain embodiments, correlations (reflecting similar probability of failure) may be employed to determine change risk according to the following rules.

If two systems (S1 and S2) are changed, correlation (S1, S2) is relatively high (e.g. >0.5), and Critical (S1)>Critical (S2), then the risk for the sequence:
first S2, then S1
is lower than the reverse sequence:
first S1, then S2.
A probability to fail in S1 is lower, if S2 has been tested before.

If two systems (S1 and S2) are changed, the Correlation (S1, S2) is relatively high (e.g. >0,5), and Critical (S1)>Critical (S2), and there may be one test of a copy before.

The test may be done for the system which is more critical. S1' is a copy of S1. Thus where Correlation (S1, S1')=1, the optimal sequence would be:
S1' with change 1; S2 with change 2; S1 with change 1.

If there is a set of systems S[1 . . . n]; where correlation of systems C(Sx,Sy)>0, and Critical (Sx)>Critical (Sy) for x<y (e.g. sorted from most critical to least critical), the optimal sequence would be:
copy S[1] to S'[1]; change S'[1]; and then change S[x] with x from n to 2.
This assumes that if the changes to the Sx are the same, and if problems with S[x] are found, they are fixed before the change is applied to S[x+1].

If systems are correlated, and the correlation is not used to plan the change, potential cost optimization may be lost.

Dependencies may be employed in various ways to determine change risk within a computer system landscape, as follows.

If systems S1 and S2 are not correlated: Correlation (S1, S2)=0. Both need to be tested and changes can be done independently.

If Dependency (S1, S2)>0, there are two options. One option is to make the changes jointly (S1+S2) in one change joint change event (Cj).

In that option, the risk for the combined change is higher than the risk of each individual change. The costs are lower, as only the combination S1new+S2new (the target versions) are to be tested. Dependency limit change options are tested. Dependency of a low critical system to a high critical system—the criticality of a system increases if the system is dependent on (or vice versa) a higher critical system. From a set of dependent systems, the criticality of the set is the maximum criticality of a system in the set.

The probability of a failure in a set is: $(1-(1-P(S1))*(1-P(S2))*( \ldots ))$

The other option is to make the changes independently: C1 on S1 and C2 on S2. In this option, the risk for the combined change is the risk lower than for the joint change Cj. But the costs are higher, as all combinations:

S1new+S2new; S1new+S2; S1+S2new are to be tested to have the option to do only one change, and revert the other change in case one change fails.

If dependency is removed, the options become larger.

An embodiment of a risk assessment system operating according to the above principles is now described. Such a system for assessment and maintenance may include modules to compute Criticality, Dependency, and Correlation of systems.

The risk assessment system also includes a UI which allows administrators to additionally define or overrule the parameters computed. For example, the administrator may add dependencies which had not been detected, and/or may remove dependencies that are present but of low importance.

Risk assessment systems according to embodiments may rely upon cloud-DB with system and change statistics. A database may be accessible via the cloud (cloud-DB) by the software vendor (e.g. SAP).

That cloud-DB may provide probabilities of failure of changes (C) for specific system definitions (S). Vendor tests, changes in the cloud, and changes by various customers (or a subset thereof, depending upon data the vendor is willing to publish) are reported to the cloud-DB, together with the parameters per system and change to allow correlation with additional systems.

Certain embodiments may allow for correlation between customer systems (S_c) with templates in the cloud. Specifically, a planning module (at the customer side or in the cloud) may be given the data about a new customer landscape (CL) to change. For example, this may be read from Solution Manager or a configuration management database.

The changes which are planned for the systems in the customer landscape CL are defined. Using the cloud-DB, the systems in the landscape are evaluated against the systems in the DB.

The correlations are computed. The system with the highest correlation in the cloud-DB is used to compute the probability of failure of the respective system in the customer landscape (CL).

Correlation may be relied upon here, because the systems with business software are highly customized, modified, and extended. Additionally, there exist various ways in how systems may combined. Also, change events are dependent upon the customer configuration.

Risk assessment may be provided by the system as follows. The absolute value of probability of failure is computed from an absolute average value of probability of failure of those systems known by vendor, and stored in the cloud-DB. Information stored in the cloud-DB may comprise feedback of other customers, vendor tests, etc. Correlation of a particular system to average from the cloud, allows computation of this probability of failure.

Next, dependencies between systems in the customer landscape CL are evaluated. Out of these dependencies, the sets of systems that are to be changed together are derived.

Then, the risk of failure of the set of systems can be computed. The system computes using dependencies, correlations, and criticality, which set of systems has which probability to fail.

The risk assessment provided by the system, allows for mitigation of that risk. An administrator of a customer landscape can use this data in a systematic and predictable way, to derive risk mitigation mechanisms.

Examples of possible options for risk mitigation can include but are not limited to removing dependencies that can lead to lower risk. For example, combinations of systems with different versions may be tested, and thus these systems do not need to be changed in a common set.

Another risk mitigation option is to create a copy of a system and test that copy. This way, the data for the risk assessment can be improved. If the tests are made to work, the risk can also be reduced.

Still another risk mitigation option is to iterate planning. Specifically, the question: "assuming these dependencies are not there, what would the risks be?", can be used to derive those dependencies would significantly reduce risk.

Figure 4:
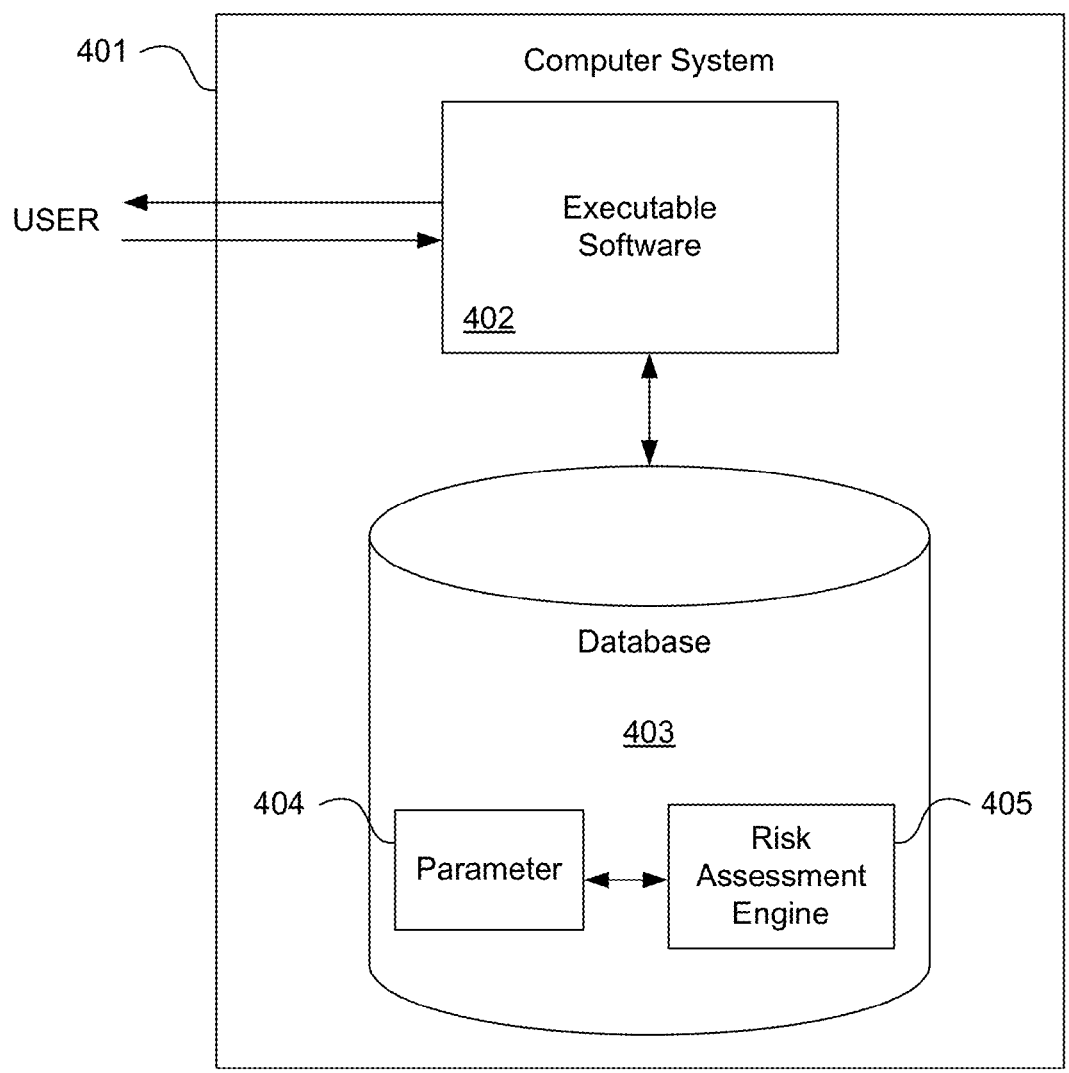
FIG. 4 illustrates hardware of a special purpose computing machine configured to perform risk assessment of change in a computer landscape according to an embodiment.

FIG. 4 illustrates hardware of a special purpose computing machine configured to perform risk assessment according to an embodiment. In particular, computer system 400 comprises a processor 402 that is in electronic communication with a non-transitory computer-readable storage medium 403. This computer-readable storage medium has stored thereon code 404 corresponding to a parameter utilized in generating a risk assessment value (e.g. system criticality, system correlation, system dependency). Code 405 corresponds to a risk assessment engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
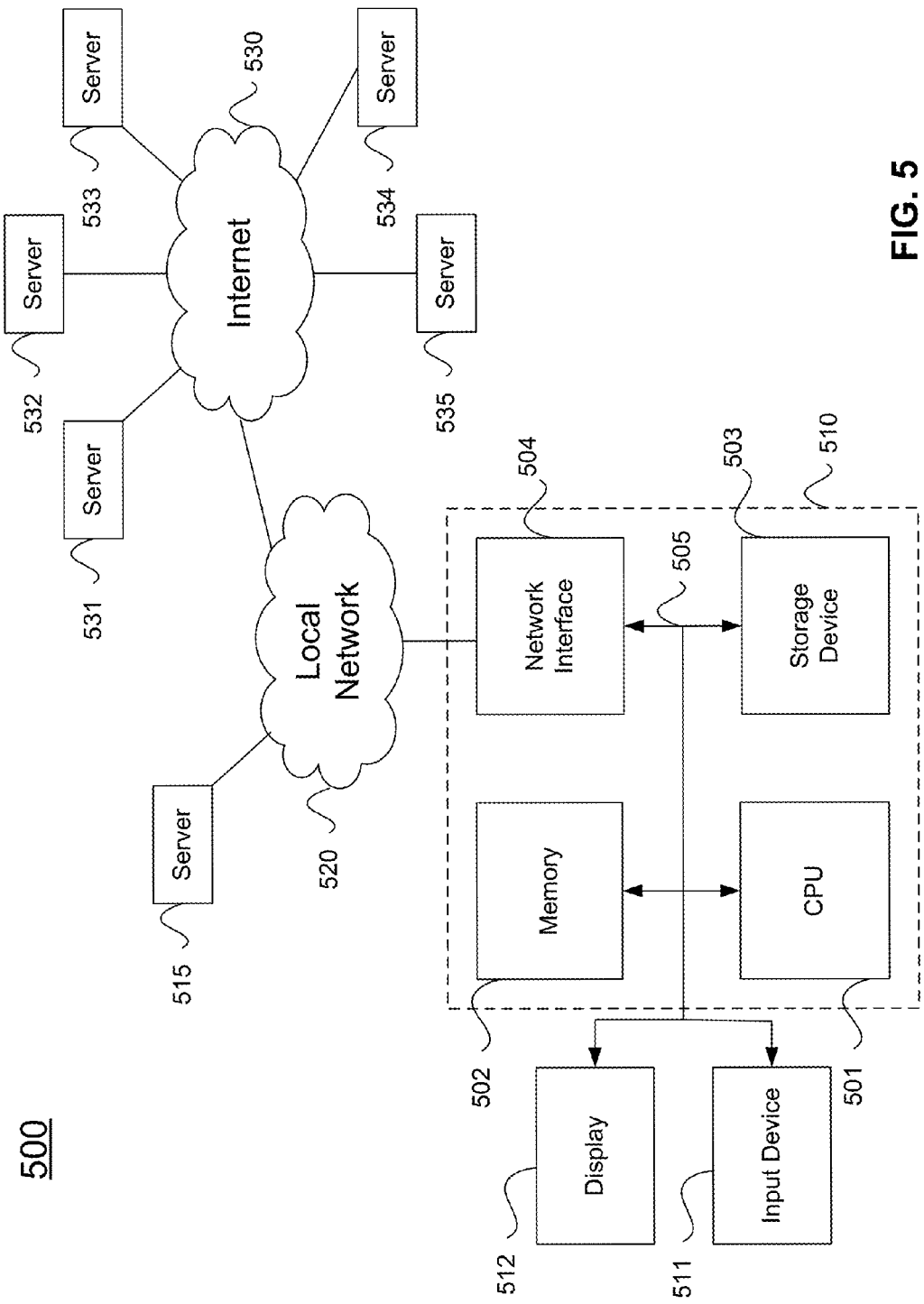
FIG. 5 illustrates an example of a computer system.

An example system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system (510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing a landscape comprising a plurality of interconnected computer systems;
causing a risk assessment engine to receive a risk parameter from an agent of one of the plurality of interconnected computer systems of the landscape, wherein the risk parameter reflects probability of failure of the one of the plurality of interconnected computer systems in view of a history of change events, wherein the history of change events reflect a similar set of failed change events between the one of the plurality of interconnected computer systems and another of the plurality of interconnected computer systems; and
causing the risk assessment engine to process the risk parameter to generate a risk value of making a change to the one of the plurality of interconnected computer systems.

2. The computer-implemented method of claim 1 wherein the risk parameter further reflects a criticality of the one of the plurality of interconnected computer systems of the landscape.

3. The computer-implemented method of claim 2 wherein the criticality is further determined from a database size of the one of the plurality of interconnected computer systems of the landscape.

4. The computer-implemented method as in claim 1 wherein the risk parameter further reflects a correlation between a first computer system interconnected with a second computer system.

5. The computer-implemented method as in claim 4 wherein the correlation reflects at least one of,
- the first computer system as a copy of the second computer system,
- the first computer system as a successor of the second computer system, or
- the first computer system as operating in a different geographic region than the second computer system.

6. The computer-implemented method as in claim 1 wherein the risk parameter further reflects a dependency between a first computer system interconnected with a second computer system.

7. The computer-implemented method as in claim 6 wherein the dependency considers a runtime dependency, an integration dependency, a configured connection, or a dependency coupling.

8. A non-transitory computer readable storage medium embodying a computer program for performing a method, said method comprising:
- providing a landscape comprising a plurality of interconnected computer systems;
- causing a risk assessment engine to receive a risk parameter from an agent of one of the plurality of interconnected computer systems of the landscape, wherein the risk parameter reflects probability of failure of the one of the plurality of interconnected computer systems in view of a history of change events, wherein the history of change events reflect a similar set of failed change events between the one of the plurality of interconnected computer systems and another of the plurality of interconnected computer systems; and
- causing the risk assessment engine to process the risk parameter to generate a risk value of making a change to the one of the plurality of interconnected computer systems.

9. The non-transitory computer readable storage medium as in claim 8 wherein the risk parameter further reflects a criticality of the one of the plurality of interconnected computer systems of the landscape.

10. The non-transitory computer readable storage medium as in claim 9 wherein the criticality is further determined from a database size of the one of the plurality of interconnected computer systems of the landscape.

11. The non-transitory computer readable storage medium as in claim 8 wherein the risk parameter further reflects a correlation between a first computer system interconnected with a second computer system.

12. The non-transitory computer readable storage medium as in claim 11 wherein the correlation reflects at least one of,
- the first computer system as a copy of the second computer system,
- the first computer system as a successor of the second computer system, or
- the first computer system as operating in a different geographic region than the second computer system.

13. The non-transitory computer readable storage medium as in claim 8 wherein the risk parameter further reflects a dependency between a first computer system interconnected with a second computer system.

14. A computer system comprising:
- one or more processors;
- a software program, executable on said computer system, the software program configured to:
- provide a landscape comprising a plurality of interconnected computer systems;
- cause a risk assessment engine to receive a risk parameter from an agent of one of the plurality of interconnected computer systems of the landscape, wherein the risk parameter reflects probability of failure of the one of the plurality of interconnected computer systems in view of a history of change events, wherein the history of change events reflect a similar set of failed change events between the one of the plurality of interconnected computer systems and another of the plurality of interconnected computer systems; and
- cause the risk assessment engine to process the risk parameter to generate a risk value of making a change to the one of the plurality of interconnected computer systems.

15. The computer system as in claim 14 wherein the risk parameter further reflects a criticality of the one of the plurality of interconnected computer systems of the landscape.

16. The computer system as in claim 15 wherein the criticality is further determined from a database size of the one of the plurality of interconnected computer systems of the landscape.

17. The computer system as in claim 14 wherein the risk parameter further reflects a correlation between a first computer system interconnected with a second computer system.

18. The computer system as in claim 17 wherein the correlation reflects at least one of,
- the first computer system as a copy of the second computer system,
- the first computer system as a successor of the second computer system, or
- the first computer system as operating in a different geographic region than the second computer system.

19. The computer system as in claim 14 wherein the risk parameter further reflects a dependency between a first computer system interconnected with a second computer system.

20. The computer system as in claim 19 wherein the dependency considers a runtime dependency, an integration dependency, a configured connection, or a dependency coupling.

* * * * *